H. M. SWEET.
TRACTOR.
APPLICATION FILED NOV. 5, 1914.
1,230,340.
Patented June 19, 1917.
2 SHEETS—SHEET 1.
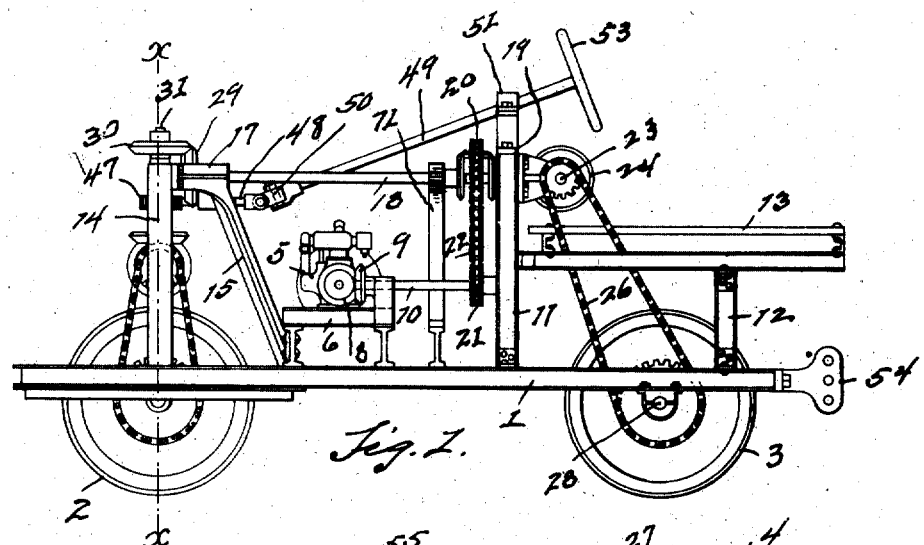
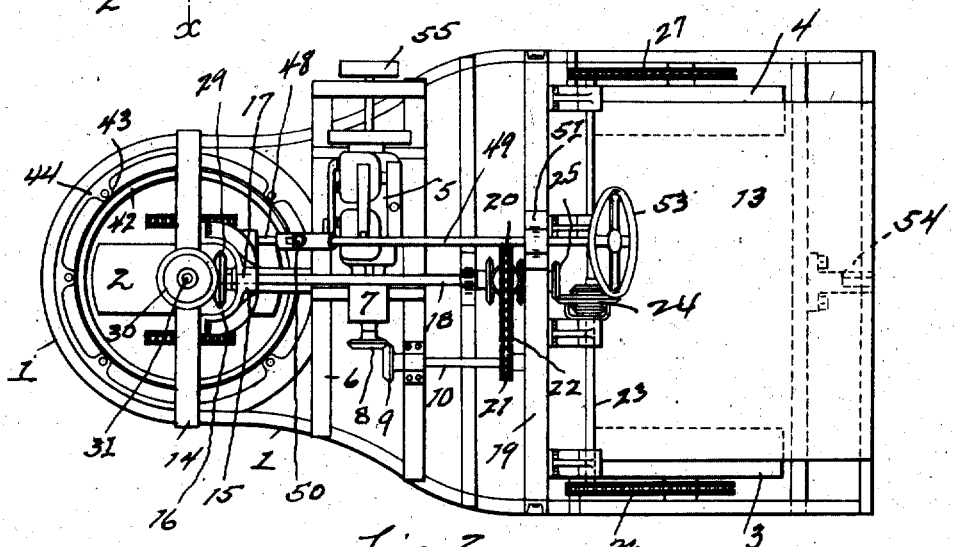
WITNESSES:
INVENTOR.
Howard M. Sweet
BY
Charles E. Winey
ATTORNEY.

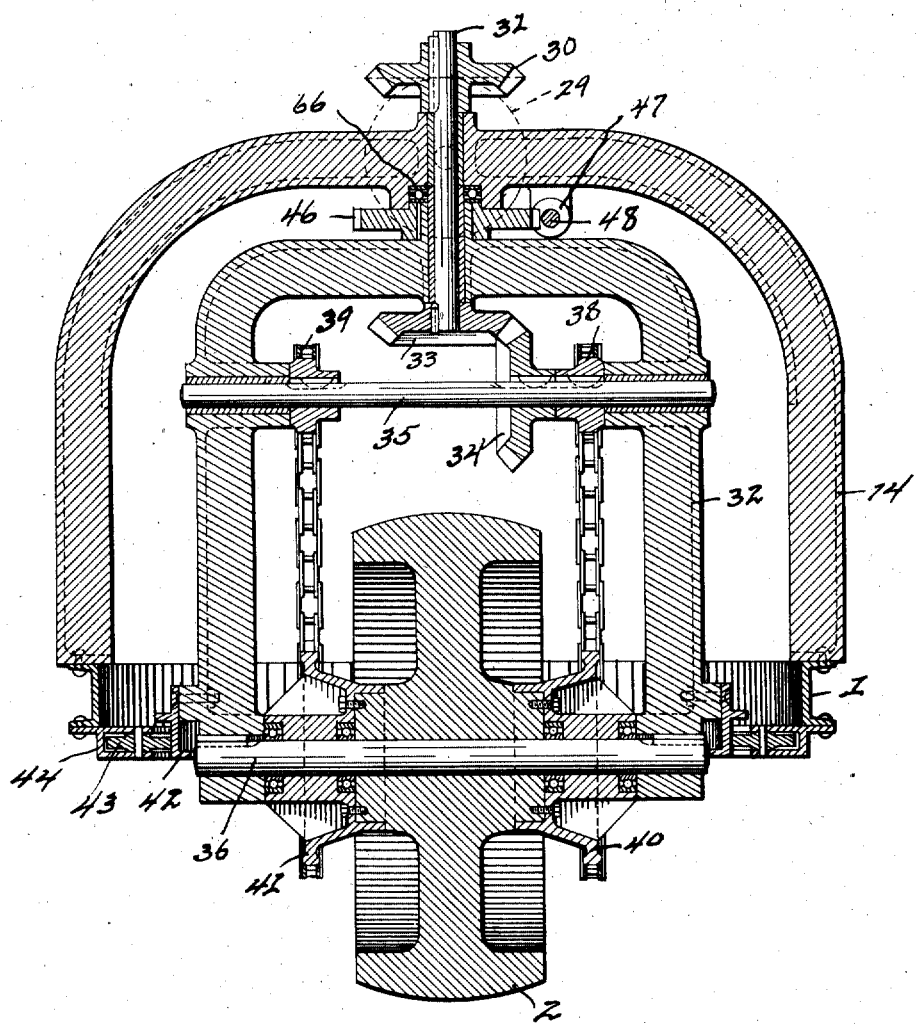

UNITED STATES PATENT OFFICE.

HOWARD M. SWEET, OF DETROIT, MICHIGAN, ASSIGNOR, BY MESNE ASSIGNMENTS, TO A. T. HARROW TRACTOR COMPANY, A CORPORATION OF MICHIGAN.

TRACTOR.

1,230,340.  Specification of Letters Patent.  Patented June 19, 1917.

Application filed November 5, 1914.   Serial No. 870,362.

*To all whom it may concern:*

Be it known that I, HOWARD M. SWEET, a citizen of the United States, residing at Detroit, county of Wayne, State of Michigan, have invented a certain new and useful Improvement in Tractors, and declare the following to be a full, clear, and exact description of the same, such as will enable others skilled in the art to which it pertains to make and use the same, reference being had to the accompanying drawings, which form a part of this specification.

This invention relates to tractors operated by gasolene motor particularly adapted for farm use and in the hauling of loads and implements of various natures. An object of the invention is a simple and efficient device for the purpose, comparatively inexpensive to manufacture and of such simplicity in operation that the unskilled individual may readily become adept in its operation.

A further object of the invention is a device of the character stated in which the weight of the apparatus is entirely carried by the propelling wheels whereby the greatest possible traction is secured. These and further objects and the various novel features of construction are hereinafter more fully described and claimed and shown in the accompanying drawings in which—

Figure 1 is a side elevation of a tractor embodying my invention.

Fig. 2 is a plan view thereof.

Fig. 3 is an enlarged vertical section taken on line $x$—$x$ of Fig. 1.

Similar characters refer to similar parts throughout the drawings and specification.

The device consists of a main frame 1 comparatively narrow at the forward end supported by the single steering wheel, and wide at the rear supported by the two rear driving wheels 3 and 4. Practically midway between the forward and rear wheels is a gasolene engine indicated at 5 carried on a framework 6 supported by the main frame. The engine may be of any well known type provided with a speed changing transmission device usually mounted in a case indicated at 7. Although not shown, it is to be understood that the transmission device is provided with levers for operating the speed changing gears and controlling the engine operation which are now well known in the art. The transmission shaft extends from the case 7 and is provided with a bevel gear 8 meshing with a similar gear 9 on the counter-shaft 10, carried in bearings mounted in the frame and during operation of the engine and by manipulation of the change speed gears the shaft 10 may be made to rotate at various speeds and either forward or reverse as will be readily understood by those familiar with the operation of such devices.

On the rear of the main frame is mounted vertical frame members 11 and 12 on which is supported a platform 13 shown more clearly in Fig. 1, and supported near the forward end of the main frame is a vertically positioned yoke 14 secured to the frame members 1, and provided with a brace 15 attached near the upper end thereof by a U shaped part 16, shown more clearly in Fig. 2. The lower end of the brace is secured to a cross-member of the engine supporting frame 6 as may be seen in Fig. 1. The brace-member 15 is also provided with a bearing 17 at the upper end for supporting the driving shaft 18, the rear end of which shaft is supported in a bearing carried by the horizontal member 19 extending between the vertically positioned framework 11. The shaft 18 is provided with a sprocket wheel 20 connected with a similar wheel 21 on the shaft 10 by means of a sprocket chain 22 whereby rotation of the shaft 10 rotates the shaft 18. Mounted in brackets carried by the horizontal member 19 is a jack-shaft 23 formed of two parts, between the ends of which is mounted the differential gear group 24 driven by a bevel gear 25 on the rear end of the shaft 18. The two parts of the jack-shaft are each provided with sprocket wheels at the outer ends connected by sprocket chains 26 and 27, with the driving wheels 3 and 4 respectively, which wheels are loosely mounted on the shaft 28. Rotation of the driving shaft 18 thus actuates the two rear driving wheels under a condition allowing a differential movement thereof.

As the drive-shaft 18 also drives the forward supporting wheel, the sprocket wheel 20 should be provided with a differential gearing of any well known type operating between abutting portions of the shaft 18 which is formed in two parts for this purpose, so that the forward and rear parts of the shaft 18 may be differentially driven to allow for difference in diameter between the rear and forward wheels or difference in rotation thereof caused by variation in the surface traversed or otherwise. To support the shaft a vertical frame 71 is provided having a bearing for the rear end of the forward part of the shaft 18, the rear part of the shaft being supported in a bearing carried by the horizontal member 19.

The forward end of the drive shaft 18 is provided with a bevel gear 29 meshing with a similar gear 30 on a vertical shaft 31 mounted in bearings in both the yoke 14 and a similar yoke 32 situated within the yoke 14 and adapted to turn on the shaft 31. On the lower end of the shaft 31 is a bevel gear 33 meshing with a similar gear 34 on a horizontal shaft 35 carried in bearings in opposite arms of the yoke 32. At the lower ends of the yoke arms is secured a shaft 36 on which is rotatably mounted the forward driving and steering wheel 2. The upper horizontal shaft 35 is provided with a pair of oppositely positioned sprocket wheels 38 and 39 connected by sprocket chains to the sprocket wheels 40 and 41 respectively, attached to the driving wheel 2 and rotatable on the shaft 36. To reduce friction the sprocket wheels 40 and 41 and drive wheel 2 may be provided with anti-friction bearings as indicated in Fig. 3. The driving shaft 18 thus drives the rear wheels 3 and 4 as well as the forward propelling wheel 2 which is adapted to swivel in a horizontal plane to steer the apparatus, the connected chain of driving mechanism being adapted to drive the wheel 2 at whatever angle it may be positioned relative to the framework.

The inner yoke member 32, as before stated, swivels at the upper end on the shaft 31 and to the lower end of the yoke member is secured a ring-shaped member 42 providing a bearing surface for a plurality of wheels 43 positioned thereabout as shown in Fig. 2, and pivoted in a ring-shaped supporting member 44 secured to the main frame members 1. This arrangement allows the yoke member 32 and the driving wheel to be turned about a vertical center and holds the yoke in a vertical position relieving the shaft 31 from strain which might otherwise be imposed thereon by inequalities in the surface traversed. A thrust bearing 66 is interposed between the yoke members 14 and 32, which receives the weight of the forward part of the device and relieves the parts of friction.

At the upper end the yoke member 32 has secured thereto a worm wheel 46 meshing with a worm 47 on the horizontal part of the steering shaft 48, which extends toward the rear of the machine and is connected to the angularly positioned steering shaft 49 by a universal joint 50. This portion 49 of the steering shaft is mounted in a bearing 51 on the horizontal frame member 19 at the proper height to be easily operated from the platform 13.

From the foregoing description it becomes evident that the engine and transmission devices control the operation of the tractor as to speed and direction of movement, and that the driving arrangement is such that all wheels supporting the device are positively driven whereby the entire weight of the tractor is utilized in traction and furthermore, although positively driven, the forward driving wheel may be rotated on a vertical axis to guide the machine.

The rear platform 13 may be of any size desired for the transportation of goods and the rear end of the frame 1 may be also provided with a draft beam 54 for attaching various machines, wagons or the like to the tractor whereby the device may be utilized in hauling. The engine shaft may also be provided with a belt wheel 55 and when the engine is made to run idle it may be employed in operation of other power operated machines such as ensilage cutters, threshers, etc.

The various levers for operation of the engine and of the speed changing mechanism should be positioned on the rear platform contiguous to the steering wheel 53 so that the entire device may be controlled and operated by a single individual.

Having thus briefly described my invention, its utility and mode of operation, what I claim and desire to secure by Letters Patent of the United States is—

1. A tractor comprising a frame work, front and rear driving units therefor, a power plant, a shaft extending longitudinally of the frame work formed of two parts in axial alinement, a differential gear group interposed between adjacent ends of the shaft, a jack shaft at the rear of the machine, a differential gear group in the jack shaft driven by one part of the driving shaft, the rear driving unit being operated by the jack shaft and the front driving unit being operatively connected with the other part of the driving shaft.

2. A tractor comprising a frame work, a single forward and a pair of rearwardly positioned supporting wheels, a power plant carried by the frame work, a driving shaft of two parts in axial alinement extending longitudinally of the frame work, the front part being operatively connected with the forward driving unit and the rear part connected with mechanism adapted to differentially drive the two rear driving wheels, a differential gearing interposed between the two parts of the driving shaft, means connecting the power plant with the last named differential gearing, and means for turning the single forward wheel about its vertical axis.

3. A tractor comprising a frame work, a single forward and a pair of rearwardly positioned supporting wheels therefor, a shaft extending longitudinally of the frame work formed of two parts in axial alinement the front part being operatively connected with the forward driving wheel, means including a jack shaft for differentially driving the two rear wheels, said means being in geared relation with the rear part of the driving shaft, a differential gear group interposed between the two parts of the drive shaft, a power plant connected with said differential group, said forward wheel being arranged to be turned about a vertical axis, and means for turning said front wheel.

4. A tractor comprising a frame work, a single forward and a pair of rearwardly positioned supporting wheels therefor, vertically positioned frame members extending upwardly at the front and rear of said frame work, a drive shaft extending longitudinally of the frame work supported by the vertically positioned frame members, said driving shaft being formed of two parts in axial alinement, a jack shaft supported by said rear vertical frame member, a differential gear group interposed in said jack shaft, said gear group being operatively connected with the rear part of the driving shaft, a differential gear group interposed between adjacent ends of the drive shaft, a power plant operatively connected with said last named differential gear group, the forward part of the drive shaft being operatively connected with the forward supporting wheel, said forward supporting wheel, being arranged to be turned about a vertical axis, and means operable at will for turning said wheel.

In testimony whereof, I sign this specification in the presence of two witnesses.

HOWARD M. SWEET.

Witnesses:
RICHARD ALSPAS,
CHARLES E. WISNER.